Figure 1:
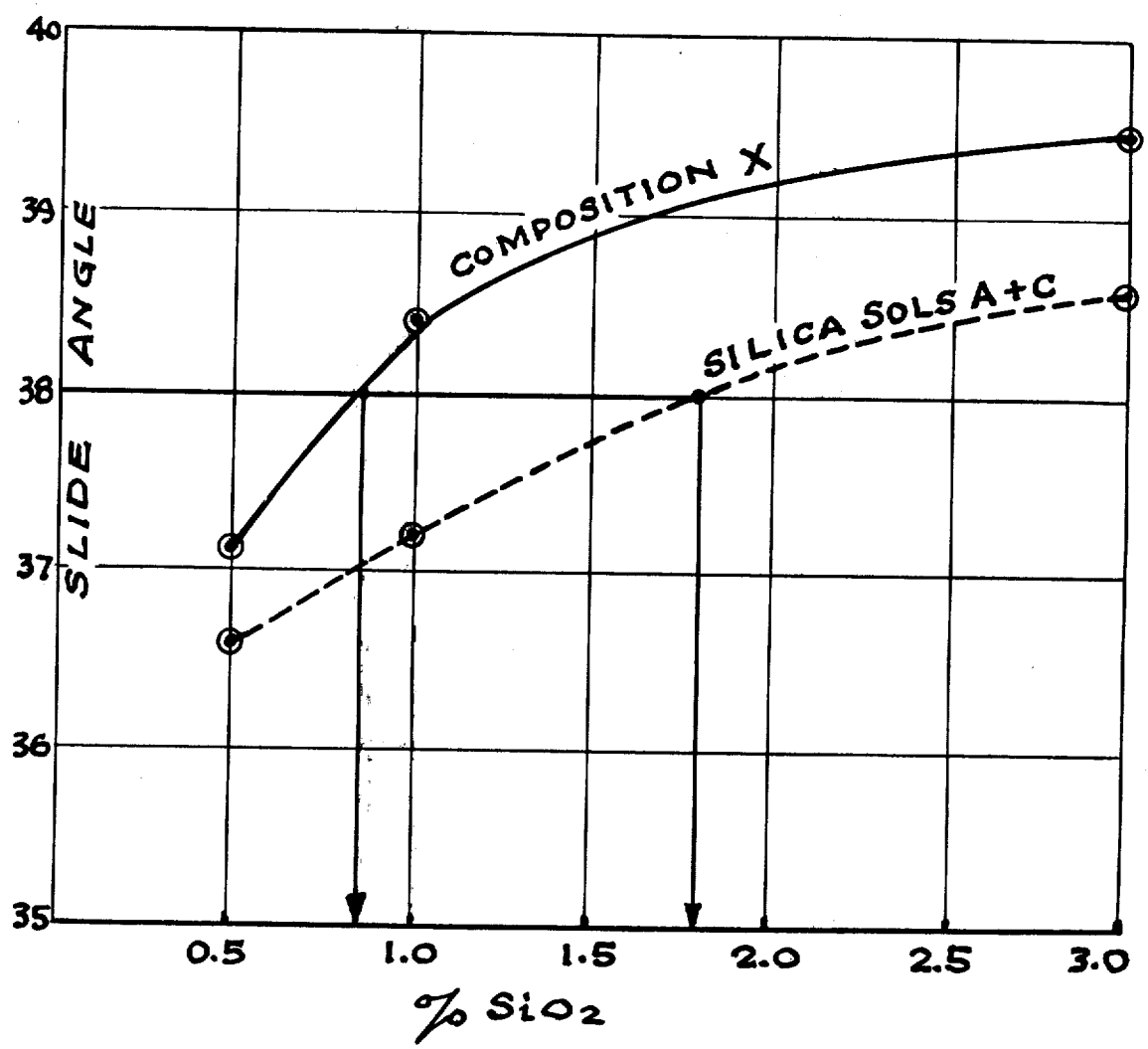

United States Patent [19]
Payne et al.

[11] 3,901,987
[45] Aug. 26, 1975

[54] SLIP RESISTANT COMPOSITION FOR PAPER COATING

[75] Inventors: Charles C. Payne, Chicago; Peter H. Vossos, Lisle, both of Ill.

[73] Assignee: Nalco Chemical Company, Oak Brook, Ill.

[22] Filed: July 5, 1974

[21] Appl. No.: 485,856

Related U.S. Application Data

[62] Division of Ser. No. 248,462, April 28, 1972, Pat. No. 3,860,431.

[52] U.S. Cl. ........... 428/219; 252/313 S; 428/241; 428/331; 428/342; 428/907; 106/36
[51] Int. Cl.² ... D21H 1/40; B32B 5/16; B32B 19/00
[58] Field of Search ......... 117/143 R, 143 A, 152, 117/154; 252/313 S; 161/162; 106/36

[56] References Cited
UNITED STATES PATENTS

| | | | |
|---|---|---|---|
| 2,643,048 | 6/1953 | Wilson | 117/152 X |
| 3,649,348 | 3/1972 | Vossos | 117/152 |
| 3,711,416 | 1/1973 | Payne et al. | 252/313 S |
| 3,754,984 | 8/1973 | Payne | 117/152 |

*Primary Examiner*—Michael R. Lusignan
*Attorney, Agent, or Firm*—John G. Premo; Robert A. Miller

[57] ABSTRACT

A silica sol concentrate having improved antiskid properties of an aqueous colloidal anionic silica sol, a polymeric flocculating agent, a polyhydric alcohol, and a biocide is useful for paper coating.

1 Claim, 1 Drawing Figure

3,901,987

SLIP RESISTANT COMPOSITION FOR PAPER COATING

This is a divisional application of our copending application Ser. No. 248,462 filed Apr. 28, 1972, U.S. Pat. No. 3,860,431.

INTRODUCTION

Various articles such as bags, cartons, and other containers fabricated from Kraft paper, cardboard and other types of cellulose material as used for the packaging of foodstuffs, chemicals and the like possess the inherent disadvantage of slipping and sliding against each other. This tendency to slip and/or slide may be undesirable and in many cases harmful. Attempts have been made to overcome this difficulty. For example, containers fabricated from crepepaper or containers treated with a form of an adhesive have been employed. Such containers have not been entirely satisfactory either for reasons of economy, poor printing characteristics, insufficient slip resistance, unpleasant or uncomfortable handling characteristics, cleanability factors, the excessive amount of material required, or for a combination of such reasons.

Prior art disclosures have shown it is possible to coat cellulosic materials with colloidal silica sols. These coatings tend to impart definite antiskidding properties to the coated cellulosic materials. The colloidal silica sols are conveniently handled and readily applied to the cellulosic materials. The use of colloidal silica sols to coat paper in order to provide slip resistance is disclosed in U.S. Pat. Nos. 2,643,048 and 2,872,094. Colloidal silica sols have also been employed to impart stiffness to paper and generally for the treatment of paper as disclosed in U.S. Pat. Nos. 2,883,661; 2,801,938; 2,980,558 and other patents.

The use of colloidal silica sols as a paper coating to provide slip resistance is sometimes referred to as frictionizing paper or as imparting antiskid or antislip properties thereto. One of the shortcomings of the colloidal silica sols taught in the prior art is that it is necessary to apply a large amount of the silica sol in order to impart the antiskid or antislip properties. It has also been desirable to obtain a product which would exhibit improved properties such as cleanability, lower corrosion rates on metal surfaces, retention of slide angle and freeze-thaw stability.

The most important properties of an antiskid composition is that of slide angle. The most desirable function of any antiskid treatment is to get the highest slide angle possible with the lowest applied dosage and retain as much of the slide angle as possible on repeated slides. Once these properties are obtained, the other properties can be built in or are dependent upon the starting materials for the effective antiskid.

OBJECTS

An object of this invention is to provide new and improved silica sol compositions which are particularly useful when applied as coatings to cellulosic sheet materials.

Another object of the invention is to provide new and useful silica sol compositions which can be prepared and stored in a concentrated liquid form and diluted for use as coating compositions.

A further object of the invention is to provide a new and useful silica sol composition which can be used in substantially reduced quantities to obtain an equivalent slide angle of silica sols taught in the prior art.

Another object of this invention is to provide a new and improved silica sol composition which exhibits improved physical properties such as cleanability, lower corrosion rates on metal surfaces, retention of slide angle and freeze-thaw stability.

Another object is to provide an improved antislip cellulosic material.

Still a further object is to provide improved antislip cellulosic materials without detrimentally affecting their printing and/or handling characteristics.

INVENTION

This invention teaches a silica sol concentrate having improved antiskid properties which comprises:

A. From 2 to 20 percent by weight of an aqueous colloidal anionic silica sol, the silica particles in said colloidal silical sol having an average diameter within the range of 4 to 40 millimicrons;

B. From 70 to 88 percent by weight of an aqueous colloidal anionic silica sol, the silica particles in said colloidal silica sol having an average diameter within the range of 60 to 120 millimicrons;

C. From 0.25 to 3.0 percent by weight of a water-dispersible, polymeric flocculating agent;

D. From 6 to 10 percent by weight of a water-soluble polyhydric alcohol; and

E. From 0 to 0.5 percent of a biocide.

The preferred composition comprises:

A. 12 percent by weight of an aqueous colloidal anionic silical sol, the silica particles in said colloidal silica sol having an average diameter of 20 millimicrons;

B. 78 percent by weight of an aqueous colloidal anionic silica sol, the silica particles in said colloidal silica sol having an average diameter of 70 millimicrons;

C. 1.0 percent by weight of polyethylene glycol dioleate, having a molecular weight of 400;

D. 8.5 percent by weight of glycerin; and

E. 0.5 percent by weight of glutaraldehyde.

The composition of this invention is a silica sol concentrate which has improved antiskid properties. These concentrated compositions can be stored and shipped in a concentrated form, later diluted by the user for application to cellulosic materials. The term "cellulosic material" as used herein is intended to include and cover the material made primarily from cellulose. The principal use of the composition is to provide antislip resistance to felted cellulosic fibers such as paper. However, they can also be applied to textiles and other felted, woven, or nonwoven material and in other applications where antislip fesistance is desired.

The composition of this invention is similar to conventional silica sols in that the silica consists of finely divided and discrete particles. The composition differs from conventional silica sols in that upon dilution the silica particles flocculate and form silica aggregates. Conventional silica sols do not flocculate upon dilution. The importance of a flocculated silica is disclosed in a pending application Ser. No. 11,627, filed Feb. 1, 1971, now U.S. Pat. No. 3,711,416. This application is incorporated herein by reference.

The polyhydric alcohol acts as an anti-flocculating agent and inhibits flocculation while the composition is in concentrated form. Upon dilution the polyhydric alcohol is no longer in sufficient concentration to act as a protection for the silica particles. The silica particles are then free to react with the globules or micelles of the flocculating agent to form silica aggregates. Flocculation occurs mainly with the smaller particle-size particles although some bridging may occur with the large particle-size particle. The result of this fact is that the actual amount of silica sol necessary to yield a given slide angle is decreased as compared to the compositions taught in the prior art.

COLLOIDAL SILICA SOL

The preparation of colloidal silica sols is well-known in the art and is described, for example, in U.S. Pat. Nos. 3,440,174; 3,462,374; 3,468,813; 3,538,015 and other patents cited therein. In general, silica sols are anionic sols. In the cationic sols the particles are positively charged and in the anionic sols the particles are negatively charged. For the purpose of this invention the colloidal anionic silica sols are used.

The antiskid composition of this invention has two anionic silica sol components. The first contains from 2 to 20 percent by weight of an aqueous colloidal anionic silica sol wherein the average diameter of the silica particles is within the range of 4 to 50 millimicrons. The preferred average diameter is approximately 20 millimicrons, with the preferred concentration of this component in the antiskid composition being 12 percent by weight.

The second silica sol component of the antiskid composition consists of from 70 to 88 percent by weight of an aqueous colloidal anionic silica sol wherein the silica particles have an average diameter within the range of 60 to 120 millimicrons. The preferred average diameter is approximately 70 millimicrons, and the preferred concentration of this component in the antiskid composition is 78 percent by weight.

The colloidal silica sols have a silica concentration of approximately 50 percent by weight. Typical anionic silica sols which are used in this invention are listed in TABLE I.

TABLE I

| Silica Sol | % Silica | pH | Average Particle Diameter (m$\mu$) | Average Surface Area (m$^2$/gm) |
| --- | --- | --- | --- | --- |
| A | 50 | 8.6 | 70 | 43 |
| B | 60 | 8.6 | 70 | 43 |
| C | 50 | 9.0 | 20 | 150 |
| D | 40 | 10.0 | 15 | 200 |

FLOCCULATING AGENT

The flocculating agents of this invention are either organic or inorganic, with the organic types being preferred. The flocculating agent should be water-dispersible and polymeric in nature. It must be capable of increasing the viscosity of the aqueous colloidal silica sol without gelling it.

In general, the compounds need not be soluble in water but should at least be dispersible in an aqueous silica sol-polyhydric alcohol system. The compounds should also be able to form a micelle or globule in an aqueous system. The flocculating agent is present in a concentration from 0.25 to 3.0 percent by weight, with the preferred range being from 0.5 to 1.5 percent by weight.

Useful types of flocculating agents are the diester of polyethylene glycols or mixtures thereof. Useful compositions are the diesters of polyethylene glycol having molecular weight of 200, 400, or 600 and fatty acids containing 14 to 18 carbon atoms; particularly the dioleate ester. Instead of oleyl, the ester group can contain a $C_{14}$, $C_{15}$, $C_{16}$, $C_{17}$ and/or $C_{18}$ group other than oleyl. The hydrocarbyl groups of the ester can be saturated or unsaturated. The preferred flocculating agent is polyethylene glycol-400, dioleate.

POLYHYDRIC ALCOHOLS

The polyhydric alcohol is present in a concentration of from 6 to 10 percent by weight with the preferred concentration of 8.5 percent by weight. The polyhydric alcohols are generally water-soluble and hydroscopic in nature. The preferred polyhydric alcohols of this invention include glycols having molecular weights from 50 to 1000. Typical examples are ethylene glycol, diethylene glycol and glycerin. The function of the polyhydric alcohol in the composition is to inhibit floc formation in the concentrated product, control the viscosity, and improve the clean-up from metal surfaces. The preferred polyhydric alcohol has been found to be glycerin.

The polyhydric alcohol can inhibit floc formation due to the fact that by its presence in the composition it can, form a protective coating around the silica particles through hydrogen bonding of the hydroxy groups. Thus, in its concentrated form the silica particles with this protective coating are not able to form aggregates or floc. As mentioned above, upon dilution the polyhydric alcohol is no longer in sufficient concentration to coat or protect the silica particles.

The improvement in clean-up of the metal surfaces is attributable to the fact that the polyhydric alcohol inhibits the siloxane reaction:

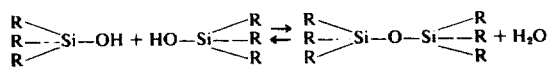

where R is $(O-Si)_n$; $n$ is an integer from 2 to 200,000. Inhibition of this reaction is important because when the siloxane bond is formed, it is quite difficult to hydrolyze the silica and reverse the reaction. As a result, a hard crust can form on a metal surface, making clean-up difficult.

BIOCIDE

The silica sol-flocculating agent-polyhydroxy hydrocarbon mixture is subject to microbiological attack. In order to control and eliminate the growth of organisms such as aerobacter and pseudomonus bacteria, aspergillus niger mold, and troublesome desulfovibuo and clostridia anaerobic bacteria it has been found that certain biocides can control bacteria and mold.

Preferred biocides are those which control bacteria and mold but do not decrease the stability of the sol. Typical biocides are glutaraldehyde, ethylene diamine, hydrogen peroxide and methyl p-hydroxybenzoate. The preferred biocide is glutaraldehyde.

The biocide is present in a concentration of 0 to 0.5 percent by weight, the preferred concentration being from 0.3 to 0.5 percent by weight.

COATING APPLICATION

The application of the composition is not limited to any special type of cellulosic material but the invention is especially useful for coating cellulosic sheet material employed in making paper bags, cartons, wrapping paper and the like. These sheet materials are made in various weights but the particular weight is not material from the standpoint of the invention. Nor is the chemical treatment of the cellulose used in making paper or similar sheet material critical. Thus, the cellulosic sheet material may be made from unbleached soft wood kraft pulp, sulfite and ground wood pulp blends, ground wood and bleached kraft blends, or the like. It will be recognized that antislip coatings on cartons and bags are particularly important where the cartons and bags are stacked on one and other and the coating prevents slipping.

Another important application of the composition is to clay-coated paper. This type of paper has either a clay or clay/starch coating.

The quantity of the coating composition applied to a cellulosic sheet material for the purpose of the invention is subject to variation, but is preferably at least 0.02 pounds and usually within the range of 0.05 pounds to 0.5 pounds per 1000 square feet of surface of such material, expressed as $SiO_2$. The coating was applied with a trailing blade coater which is a tool for applying a very uniform layer of coating. The test sheets were 9 inches × 12 inches.

The coater comprised a flexible trailing blade fitted with a rubber covered backup cylinder and hand crank. The coating was applied to a leading edge of the test sheet with an eye dropper and then spread evenly over the sheet by the coating blade as the backup cylinder and the test sheet were rotated past the blade.

After the paper was coated the treated paper and a water treated blank were equilibrated under TAPPI standard conditions of temperature and humidity for at least 72 hours.

The finally dried coated papers and blank papers were then subjected to testing on the slide angle tester. Each sheet was tested for a critical angle, i.e., the angle at which the test block slides down the plane on a St. Regis slide angle tester, Model CS-152 using the suggested TAPPI method T-503SU-67.

The St. Regis slide angle tester may be generally described as comprising a sled and an inclined plane. The sled is a metal block preferably rectangular with a flat plane lower surface, 8.9 ± 1.3 centimeters (3.5 ± 0.5 inches) wide and 10.2 ± 2.5 centimeters (4.0 ± 1.0 inches) long and of such weight as to provide a measure of 14 ± 3 grams per centimeter squared (0.2 ± 0.04 psi) when horizontal. The sled must also include a means for clamping the leading edge of the test specimen to the front or to the top surface of the sled.

The inclined plane is a plain surface hinged so it can be tilted with a smooth imcompressible top surface of non-magnetic material having a width of at least one inch wider than the sled and a length sufficient to permit the sled to move at least one-half inch and provided with a clamp for the test specimen at the upper end of the plane (and with a bumper stop at the lower end). Also, the incline plane should include a means to indicate the angle of displacement of the plane within 0.5° and some means for smoothly increasing the inclination of the plane from the horizontal to an arch of at least 45° at a rate of 1.5 ± 0.5° per second.

Test sheets of paper are cut and affixed to the sled. They are cut so that they are a little longer than the contacting area so that the sheet will extend slightly beyond the bottom edge of the sled.

The outer sheet is cut to be affixed to the surface of the plane. It is cut large enough to cover at least the working surface of the area.

The plane is leveled so that it is horizontal when the inclinometer indicates zero.

One sheet is mounted on the plane with the machine directly parallel to the direction of the slide and with the surface to be tested facing upward. The other sheets are attached to the sled. The sled is then positioned on the top of the lower sheet with its crosswise direction parallel to the direction of the slide and with the surface to be tested facing downward. Likewise, surfaces of the specimen are now in contact with their machine directions at right angles.

There is allowed a dwell time of 30 ± 5 seconds, then the plane is inclined at the specified rate of 1.5 ± 0.5° per second. The inclinator is stopped when the sled starts to move. The sled is permitted to slide until it stops. The slide angle is recorded to the nearest 0.1°. At this point the sled is lifted along with the attached speciman and the entire assembly is placed at the original starting position with the plane in the horizontal position.

In order to determine the retention of antiskid properties when subjected to continual sliding the tested paper was subjected to ten successive slides. After the ten successive slides the paper was once again tested for its critical or slide angle.

EXAMPLES

The best mode contemplated for the practice of the invention is illustrated by the following examples:

EXAMPLE I

In order to illustrate the synergistic effect of the anionic silica sols, flocculating agent and polyhydric alcohol, a series of tests were performed to show the improvement in slide angle by the use of this composition. The results are listed in TABLE II.

TABLE II

| Sample | Angle of Friction |
|---|---|
| Blank Paper + DI $H_2O$ | 35.3° |
| 0.5% Silica Sol C | 37.6° |
| Difference between Silica Sol C and blank | 2.3° |
| 0.01% polyethylene glycol-400, dioleate | 36.5° |
| Difference between polyethylene glycol-400, dioleate and blank | 1.2° |
| 0.5% Silica Sol C + 0.01% polyethylene glycol-400, dioleate | 39.7° |
| Difference between Silica Sol C + polyethylene glycol-400, dioleate and blank | 4.4° |
| Sum of Silica Sol C (alone) + polyethylene glycol-400, dioleate (alone) results | 3.5° |
| Difference due to synergistic effect | 0.9° |

The results in TABLE II show that by the combination of the silica sols, the flocculating agent and the polyhydric alcohol the slide angle and increased slide angle is obtained as compared to that without any glycerin or polyethylene glycol-400, dioleate.

It is seen that the antislip effect obtained with mixtures substantially greater than that obtained from a coating of either the silica sol alone, the flocculating agent alone, or the polyhydric alcohol alone. Hence the synergistic effect is clearly demonstrated.

EXAMPLE II

A 93.3:6.7 mixture of Silica Sols A + C from Table I was prepared as well as Composition X.

Composition X 78.0% Silica Sol A
12.0% Silica Sol C
0.5% polyethylene glycol dioleate mix
9.0% glycerin
0.5% glutaraldehyde Portions of each were diluted to different silica content concentrations with deionized water. The polyethylene glycol dioleate mix is a 1:2:1 ratio of polyethylene glycol dioleates having molecular weights of 200, 400 and 600 respectively.

This composition was then coated on kraft wrapping paper (50/ream) and evaluated on a slide angle tester in the manner previously described. A test was also run with a blank coated with deionized water in the manner previously described with a solution of the silica sol per se (C). The results obtained from these samples are shown in TABLE III.

TABLE III

| $SiO_2$ Concentration | Slide Angle A + C | Coeff. of Friction | Composition X | Coeff. of Friction |
|---|---|---|---|---|
| 0.5% | 36.6° | 0.74 | 37.1° | 0.76 |
| 1.0% | 37.2° | 0.76 | 38.4° | 0.79 |
| 3.0% | 38.6° | 0.80 | 39.5° | 0.82 |

Control = 32.5° (0.64)

The data from TABLE III is plotted in FIG. 1. FIG. 1 illustrates that at given slide angle the amount of silica necessary by using Composition X as compared to the A + C silica sol mixture is substantially less. For example, at a slide angle of 38° the amount of silica necessary to reach that level in the A + C silica sol mixture is approximately 1.78 percent. The amount of silica to achieve the 38° slide angle using Composition X is approximately 0.87 percent. Thus the amount of silica using the synergistic combination in Composition X is decreased by over 50 percent. A similar decrease will be obtained for any other slide angle chosen. The results obtained in this particular example illustrate the point that the flocculated silica sol upon dilution yields improved slide angle results. The Composition X is a representative composition of this invention. The composition formed by the mixture of silica sols A + C did not exhibit flocculation upon dilution, resulting in poorer slide angle results.

EXAMPLE III

To determine the corrosion rate of Composition X as compared to a standard silica sol, such as silica sol C, small coupons of mild steel were inserted into beakers containing Composition X and silica sol C respectively. The concentration of silica was varied from 0.5 to 3 percent. The results are shown in TABLE IV.

TABLE IV

| | Corrosion Rates of X vs. C on Mild Steel | |
|---|---|---|
| $SiO_2$ Concentration | Corrosion Rate Silica Sol C (Mills/Yr Penetration) | Corrosion Rate Composition X (Mills/Yr Penetration) |
| 0.5% | 6.7 | 2.1 |
| 1.0% | 7.5 | 1.5 |
| 3.0% | 7.0 | 1.3 |

The results shown in TABLE IV illustrate that the corrosion rates by using Composition X result in substantial decrease in the corrosion rate of mild steel.

EXAMPLE IV

In order to determine retention of antiskid properties when subjected to continual sliding examples of Kraft paper were subjected to 10 successive slides and then the paper was once again tested for its slide angle. The results comparing Composition X to silica sol C are shown in TABLE V.

TABLE V

| | Retention of Slide Angle of Composition X vs C with Repeated Slides | | |
|---|---|---|---|
| Sample | First Slide | Tenth Slide | Differences in Slide |
| 0.1% Silica Sol C | 37.0° | 34.2° | 2.8° |
| 0.5% Silica Sol C | 38.1° | 34.6° | 3.5° |
| 1.0% Silica Sol C | 39.2° | 35.1° | 4.1° |
| 0.1% Composition X | 36.8° | 34.2° | 2.6° |
| 0.5% Composition X | 38.8° | 35.8° | 3.0° |
| 1.0% Composition X | 39.8° | 36.4° | 3.4° |

The results illustrate that the retention of slide angle is increased by from 5 to 9 percent by the use of Composition X.

Similar results were obtained in the above Examples when the sample tested was Composition W, Composition Y and Composition Z.

| Composition W |
|---|
| 78.0% Silica Sol A |
| 12.0% Silica Sol C |
| 1.0% polyethylene glycol-400, dioleate |
| 8.5% glycerin |
| 0.5% glutaraldehyde |
| Composition Y |
| 75.0 Silica Sol A |
| 15.5% Silica Sol C |
| 2.0% polyethylene glycol-400, dioleate |
| 7.0% glycerin |
| 0.5% glutaraldehyde |
| Composition Z |
| 88.0% Silica Sol A |
| 3.0% Silica Sol C |
| 0.5% polyethylene glycol-400, dioleate |
| 8.0% glycerin |
| 0.5% glutaraldehyde |

EXAMPLE V

To illustrate that the polyhydric alcohol inhibits flocculation in the concentrated product the following samples were prepared.

TABLE VI

| Sample | Silica Sol A | Silica Sol C | PEG* | Glycerin | Initial Viscosity | 1 Day Viscosity | 13 Day Viscosity |
|---|---|---|---|---|---|---|---|
| 1 | 84% | 5 | 0.5 | 0.0 | 335 cps | 2700 cps | gelled |
| 2 | 84% | 5 | 0.5 | 8.5 | 250 cps | 2150 cps | 10,800 cps |

TABLE VI-continued

| Sample | Silica Sol A | Silica Sol C | PEG* | Glycerin | Initial Viscosity | 1 Day Viscosity | 13 Day Viscosity |
|---|---|---|---|---|---|---|---|
| 3 | 78% | 12 | 1.0 | 8.5 | 120 cps | 500 cps | 740 cps |

*PEG Dioleate, 400

The results illustrate that by the addition of glycerin to the concentrate the viscosity is substantially decreased. The decrease in viscosity becomes more dramatic with passage of time as denoted by the one day and 13 day viscosities.

EXAMPLE VI

The following samples were prepared and the slide angles measured.

TABLE VII

| $SiO_2$ Concentration | Slide Angle Silica Sol A | Coeff. of Friction | Slide Angle Silica Sol A + 0.5% Floc Mix | Coeff. of Friction |
|---|---|---|---|---|
| 0.1% | 36.5° | 0.74 | 36.0° | 0.73 |
| 0.3% | 37.4° | 0.76 | 37.7° | 0.77 |
| 0.5% | 37.8° | 0.78 | 37.3° | 0.76 |
| 0.75% | 38.4° | 0.79 | 37.8° | 0.78 |
| 1.0% | 38.6° | 0.80 | 38.8° | 0.80 |
| 3.0% | 39.6° | 0.83 | 39.6° | 0.83 |

Control = 34.6°(0.69)

Floc mix is a 1:2:1 ratio of polyethylene glycol dioleates having molecular weights of 200, 400 and 600 respectively.

The data presented above illustrates that there is no flocculation in the large particle size silica sol. Flocculation occurs mainly with the smaller particle size sol although some bridging may occur with the large particle size sol.

We claim:

1. A cellulosic material having a surface coated with a dried coating of a composition consisting essentially of:
   A. from 2 to 20 percent by weight of an aqueous colloidal anionic silica sol, the silica particles in said colloidal silica sol having an average diameter within the range of 4 to 40 millimicrons;
   B. from 70 to 88 percent by weight of an aqueous colloidal anionic silica sol, the silica particles in said colloidal silica sol having an average diameter within the range of 60 to 120 millimicrons;
   C. from 0.25 to 3.0 percent by weight of a water-dispersible, polymeric flocculating agent;
   D. from 6 to 10 percent by weight of a polyhydric alcohol; and
   E. from 0 to 0.5 percent of a biocide;

said coating to be applied at the rate of 0.05 to 5 pounds per 1000 feet square of said surface, expressed as $SiO_2$.

* * * * *